T. Hyatt,
Vault Cover,
№ 653, Reissued Feb. 1, 1859.
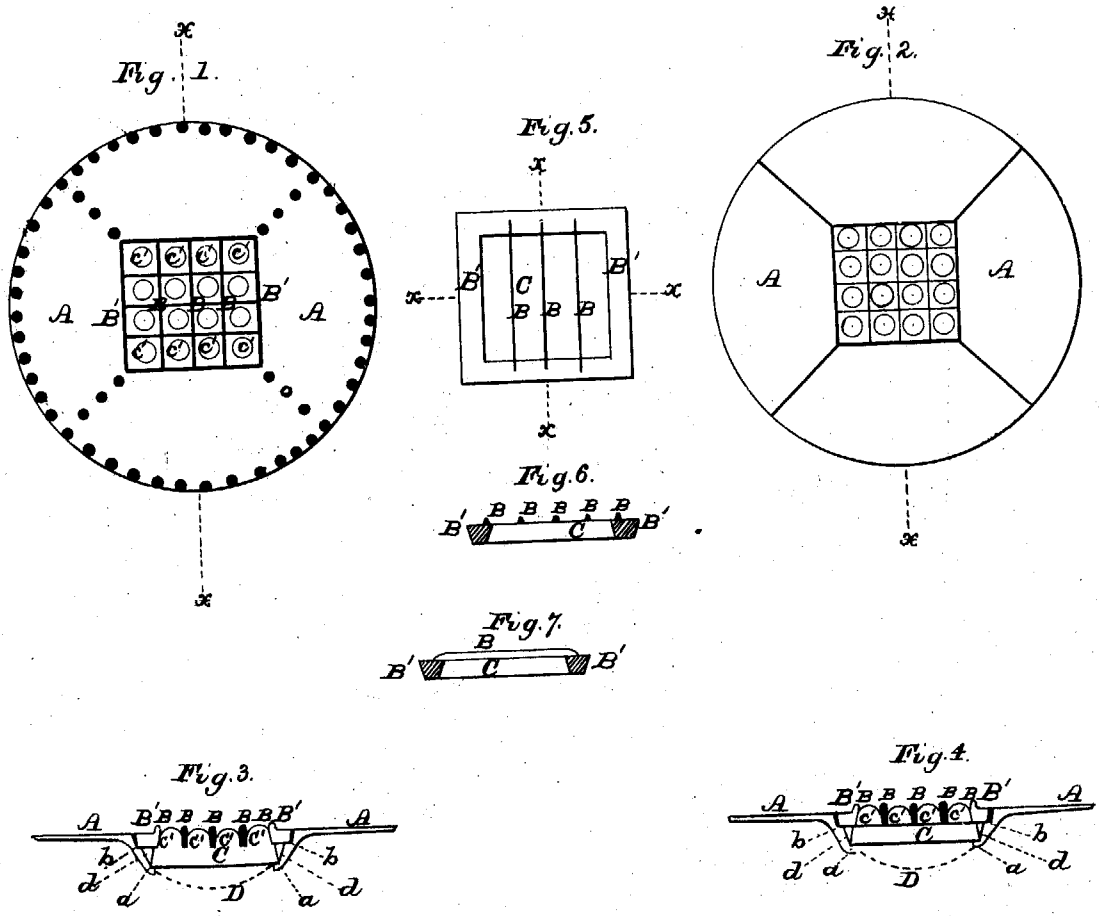
Witnesses:
Wm. H. Nichols
Andrew De Lacy.
Inventor:
Thaddeus Hyatt.
N. PETERS, PHOTO-LITHOGRAPHER, WASHINGTON, D. C.

UNITED STATES PATENT OFFICE.

THADDEUS HYATT, OF NEW YORK, N. Y.

IMPROVEMENT IN VAULT-LIGHTS.

Specification forming part of Letters Patent No. 11,695, dated September 19, 1854; Reissue No. 653, dated February 1, 1859.

*To all whom it may concern:*

Be it known that I, THADDEUS HYATT, of the city, county, and State of New York, have invented certain new and useful improvements in illuminating vault-covers for the closing of openings from streets or yards into vaults, and through the decks of vessels into cabins, and for all other situations where the glass used in such covers is liable to be broken out, and where in such cases persons stepping upon them would be exposed to harm, the object of the present improvement being to secure the greatest amount of light compatible with full protection to the public against injury.

The ordinary illuminating vault cover is simply a rim of metal with a large glass set in its center. This glass by the passage of persons and the rolling or dragging of bodies over it soon becomes scratched, then fractured, and finally broken into pieces, which fall out, and so leave a dangerous opening, jeopardizing the lives and limbs of those who pass over it, and expose the place intended to be inclosed. To remedy these evils, I invented, and in the year 1845 patented, a vault-cover, wherein a series of small holes occupied the place of the one large hole of the ordinary cover. These holes were closed by a series of small glasses, thus forming a grating sufficient for the support of persons and objects passing over it, with the apertures for the admission of light protected by the series of small glasses. It was deemed desirable, however, to avoid the use of so many small pieces of glass and the numerous joints incident thereto, and to obtain an increase of light beyond what would be obtained by the said cover of 1845, but with a like security to the public and protection to the glass and the place beneath. These objects I have attained—the increase of light and the reduction of the number of glasses and joints—by having one large opening in the metal frame forming the vault-cover filled by one large glass, as in the old illuminating-cover known prior to my invention patented in 1845, as it is evident that the greater the diameter of a hole compared to its depth the greater the number of angular rays of light that will pass through it, and the safety of persons in passing over it, in case of accident to the glass, by combining with the glass a metal grating, which, without the glass, will prevent accident to persons passing over it, while at the same time the metal grating may afford protection to the glass.

The mode of application of my said invention is as follows: As to the glass, I use, first, either glass plane upon both the upper and under surfaces and sufficiently large in its diameter to fill the aperture in the metal frame; or, secondly, I use a glass plate plane on its under surface, but having its upper one channeled so as to form either ridges or knobs thereon, the knobs being either circular or square; or, thirdly, I use a double layer of glass, as is more fully described in what follows.

As to the metal frame which holds the glass, it is simply a rim of metal forming the main body of the vault-cover. The hole in its center to receive the glass may be of any convenient size. Two rabbets—one above the other—are formed in the frame around the central hole, the lower one of which is for the glass to rest in and the upper one of which is for the grating to rest in above the glass.

As to the grating or glass protector, it is in diameter about two inches larger than the glass which it covers, and rests in the metal frame in a rabbet, as before mentioned, to which it is confined by bolts or screws. The form of this grating or protector should be adapted to the form of the glass, as one improperly constructed might entirely defeat one of the objects for which a glass is required in a vault-cover—viz., the admission of light—as will more fully appear from what follows. A suitable grating for the purpose is composed of a frame and bars attached thereto or cast therewith which cross the central space inclosed within the frame, the upper and under surfaces of the bars being in the same plane with the frame. Let such a grating as this be placed upon the level surface of such a glass, and it is evident that in an exposed situation the spaces between the bars would become rapidly choked with dirt in summer and with ice, snow, and mud in winter. These accumulations could be neither swept nor brushed out. They must be dug out at a great expense of time and trouble; hence it is apparent that the upper face of the glass must not be below the general surface of the vault-cover, nor must it be covered by any metal plate or grating having interstices to hold the dirt, from which it cannot be swept as readily as from any other part of the cover.

A glass like that first described, if protected by a covering-plate, must have one in the form of a grate, all of whose bars run parallel to each other, there being no cross-bars. The space inclosed within the grate-frame must be unobstructed by the bars, which, instead of crossing it, must cross above it, and consequently the ends of the bars must be lapped onto the upper side of the frame, as may be seen by reference to the drawings, Figs. 5, 6, and 7. By this arrangement of the parts the grate-frame, instead of surrounding its bars, incloses the glass only, so that the upper face of the glass rises up to the same level with the face of the vault-cover, the bars of the grating being above it as well as above the grate-frame to which they are attached, as aforesaid.

The second form of glass mentioned is adapted to a grating made in the usual manner, with or without cross-bars. In this case the grate-bars sink into the channels in the upper face of the glass, the projecting portions of the glass, whether in the form of ridges or knobs, rising up into the spaces between the grate-bars and filling them to the exclusion of dirt, snow, ice, &c.

The third form of glass described consists of a double layer of glass for greater security against accident, so that if the upper one should be broken a dangerous hole may not be exposed in the interval of repair. The glasses are set in the vault-cover in the manner above described. The upper glass may consist of one or many, the arrangement of which, from what has already been said, will be readily understood by reference to the accompanying drawings, and to the description thereof below. India-rubber or other suitable material may be introduced between the layers of glass.

Referring to the annexed drawings, making part of this specification, Figure 1 is a top view. Fig. 2 is a reverse view thereof; Fig. 3, a transverse section of the same through the line *x x*. Fig. 4 is a transverse section, similar to Fig. 3, but showing a double layer of glass, as above described, the upper layer being composed of a number of small glasses or knobs like the protuberances on the glass described "secondly." Figs. 5, 6, and 7 represent a glass such as first described, in combination with a grating having no cross-bars.

Similar letters indicate like parts in all the figures.

A A is the metal frame forming the main portion of the vault-cover, in which the glass C and the grating B′ B′ B B B rest each in a rabbet, as seen at *a a b b*, Figs. 3 and 4.

D, Figs. 3 and 4, is the central opening in the metal frame A A, occupied by the glass C.

*d d*, Figs. 3 and 4, is a space about the edges of the glass, which is filled in with putty or other suitable cement to make a water-tight joint. *c′ c′ c′ c′* represent the knobs of glass before described. Fig. 3 shows them as the result of channels sunk in the face of the glass plate C. Fig. 4 shows them separate from the glass plate C and forming a layer above it, as described. B′ B′, seen in all the figures except Fig. 2, (most distinctly at Fig. 5,) shows the grating. The small capitals B B B B B show the bars of the grating, while the large capitals B′ B′ indicate more particularly the frame of the grating to which the bars are attached. Fig. 6 is a cross-section of Fig. 5 at *x x*. Fig. 7 is a cross-section of Fig. 5 at *x′ x′*.

Figs. 3 and 4 represent the channels in the face of the glass C, into which the bars B B B B B of the grating B′ B′ sink, and between the spaces of which bars the knobs *c′ c′ c′ c′* on the glass C rise to the level of the main cover, where they are slightly convex, the convexity being that much higher than the main level of the cover, Fig. 4 representing the knobs independent of the plate C, but resting as a layer upon it. *a a* and *b b* in Figs. 3 and 4 represent the rabbets in the metal frame A A.

It will be obvious from the foregoing that instead of making the frame of a size adapted to one large opening only, it may be enlarged to any extent desired and provided with several large openings, each provided with a glass and protection grating.

I have thus specified the nature or character of my said invention and described the various modes in which I have contemplated the application thereof; but I do not wish to be understood as limiting my claim to such modes of application, as other modifications may be devised within the range of my invention.

What I claim as my invention, and desire to secure by Letters Patent in the construction of illuminating vault-covers, is—

The open frame with its large aperture or apertures closed with glass, substantially as herein described, in combination with the protection-grating, substantially as and for the purpose described.

THADDEUS HYATT.

Witnesses:
WM. H. BISHOP,
ANDREW DE LACY.